Aug. 8, 1967

R. E. PRICE 3,334,449

ADJUSTABLE THROW CRANK CLAMPING FIXTURES

Filed Nov. 20, 1964

INVENTOR
RALPH E. PRICE
BY
*Hugh N. Roehr*
ATTORNEY

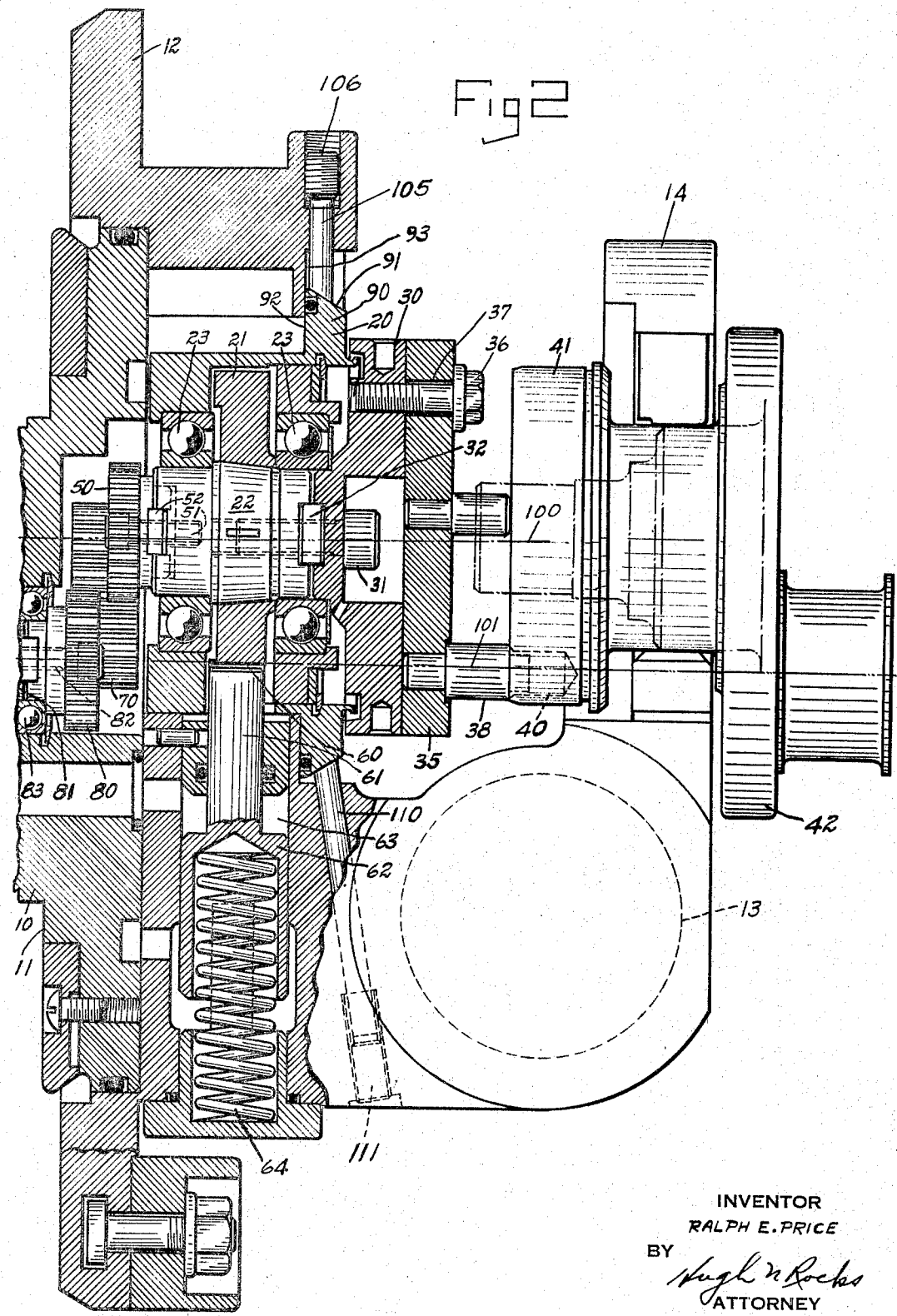

Aug. 8, 1967   R. E. PRICE   3,334,449
ADJUSTABLE THROW CRANK CLAMPING FIXTURES
Filed Nov. 20, 1964   3 Sheets-Sheet 3

INVENTOR
RALPH E. PRICE
BY
ATTORNEY

United States Patent Office 3,334,449
Patented Aug. 8, 1967

3,334,449
ADJUSTABLE THROW CRANK CLAMPING FIXTURES
Ralph E. Price, Waynesboro, Pa., assignor to Landis Tool Company, Waynesboro, Pa.
Filed Nov. 20, 1964, Ser. No. 412,762
7 Claims. (Cl. 51—237)

ABSTRACT OF THE DISCLOSURE

This disclosure consists of an adjustable throw crank clamping fixture for a crank grinding machine which has automatic means for rotary indexing of a crankshaft. The automatic indexing mechanism includes a pinion on the index plate through which the crankshaft is driven and another pinion on the index control mechanism. In order to maintain a driving relation between the two pinions for different radial positions of the index plate required for different throw crankshafts, an intermediate gear is provided which is shifted in response to the throw adjusting means to maintain operative engagement of the two pinions for the entire range of the throw adjusting means.

---

This invention relates to apparatus for grinding crankshafts automatically, particularly to apparatus for effecting automatic angular index of a crankshaft to place successive crankpins in position to rotate about their own axes and to adjust crank clamping fixtures for crankshafts of different throws.

It is desirable to grind on the same machine crankshafts having different throws. Ordinarily, adjusting a crank fixture to accommodate cranks of different throws, can be accomplished by means which are well known. However, where the crank rotating fixure includes provision for automatic angular indexing, special provision must be made to maintain operative relation between elements of the indexing mechanism while adjusting one or more of said elements radially. The adjustment involves changing the relation between two pinions, one of which is in fixed radial position, the other of which is adjusted radially with the other elements of the indexing mechanism to accommodate a crankshaft of a different throw. The driving connection between these two pinions is an intermediate gear in operative engagement with both of said pinions. When the center distance between the pinions is changed due to radial adjustment of one pinion, the position of the intermediate gear must change accordingly in order to maintain said operative relation.

It is, therefore, an object of the present invention to provide an adjustable throw crank clamping fixture having automatic angular indexing, and means for maintaining operative relation in the gearing for said indexing mechanism while adjusting from one throw to another.

Another object is to provide means for adjusting the relation between the gears of an index mechanism in response to radial adjustment of said elements.

Another object is to provide means whereby an idler gear maintains operative relation with a pair of radially spaced gears in the variable center to center spacing of said gears.

Another object is to provide means operable in response to center to center adjustment of a pair of radially spaced gears to shift an idler gear about the center of one of said gears maintaining contact of said idler gear with both of said radially spaced gears.

FIG. 2 is a partial sectional front elevation of a crank grinder throw adjusting and rotary indexing mechanism.

Figure 1:
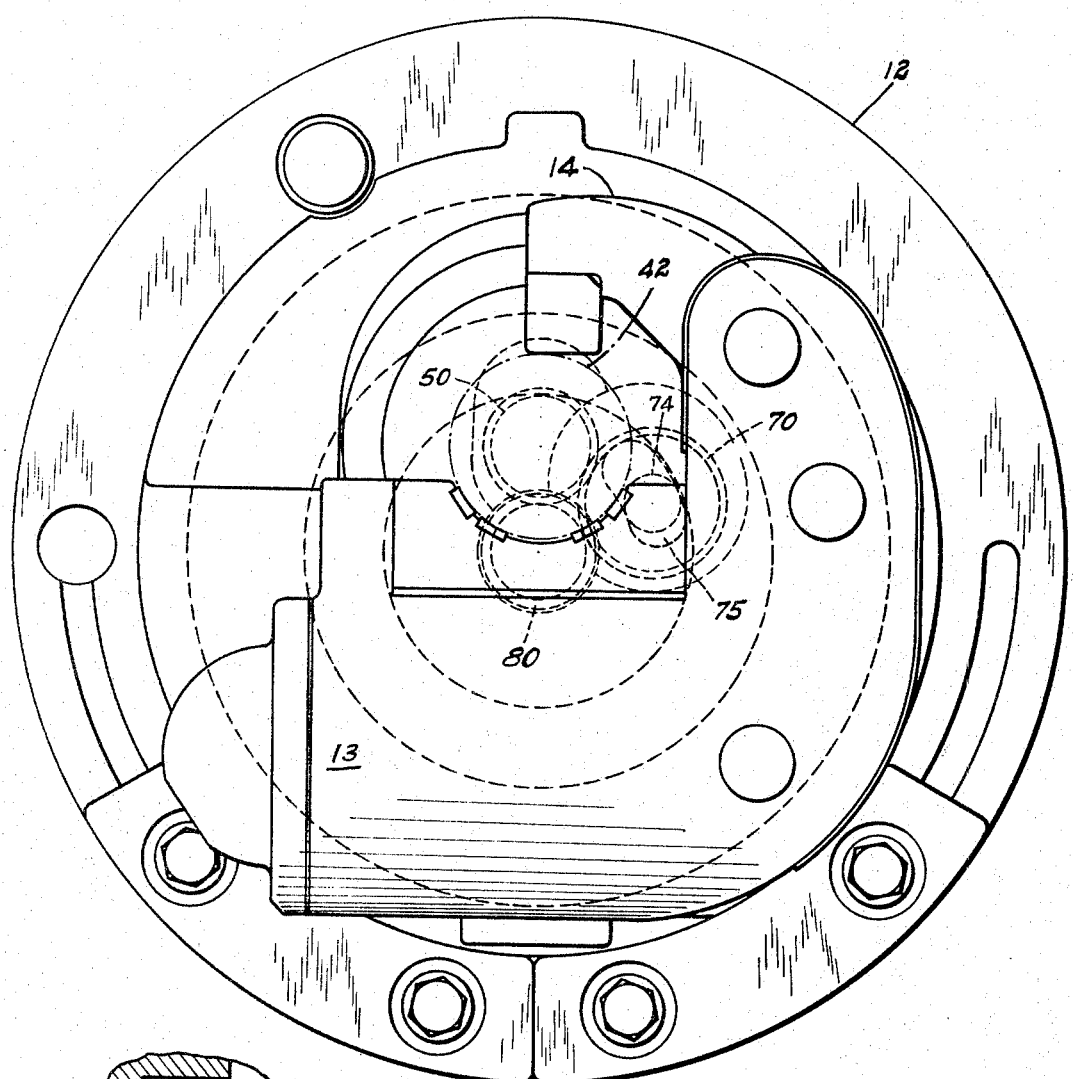
FIG. 1 is a right hand view of a left hand crankhead.

In a crankpin grinding machine, the crankshaft is held with its main bearing offset from the axis of the work drive spindle. The throw of the crank is the distance between the main bearing axis of the crankshaft and the axis of any crankpin. The throw also represents the distance between the axis of the crankshaft and the axis of the work drive spindle. The axis of the work drive spindle is always in line with the axis of at least one crankpin during a crankpin grinding operation.

Spindle 10 has a flange portion 11 to which housing 12 is attached. Housing 12 includes the clamping cylinder 13 and clamping arm 14 as well as index housing 20 which is mounted for radial adjustment in housing 12. The rotatable index plate 21 is mounted on shaft 22 which is rotatably supported by bearings 23 in housing 20.

Locator plate 30 is attached to one end of shaft 22 by means of screw 31 and key 32. Locator pin plate 35 is attached to plate 30 for angular adjustment thereon by means of screws 36 in arcuate slots 37. Locating pin 38 extends axially from plate 35 to enter a locating hole 40 in flange 41 of crankshaft 42. At the other end of shaft 22, pinion 50 is attached by means of screw 51 and key 52.

Index plate 21 has a notch 60 for each crankpin on a crankshaft. Crankshaft 42 and index plate 21 are located in proper position by plunger 61. Plunger 61 has a piston portion 62 in cylinder 63 in housing 12. Piston 62 and plunger 61 are held in said notches 60 by means of spring 64. Plunger 61 may be retracted from notches 60 in index plate 21 by applying fluid under pressure in the upper end of piston 62.

Figure 2A:
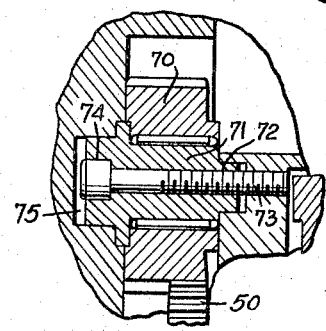
FIG. 2A is a partial sectional view through the idler gear.
Figure 3:
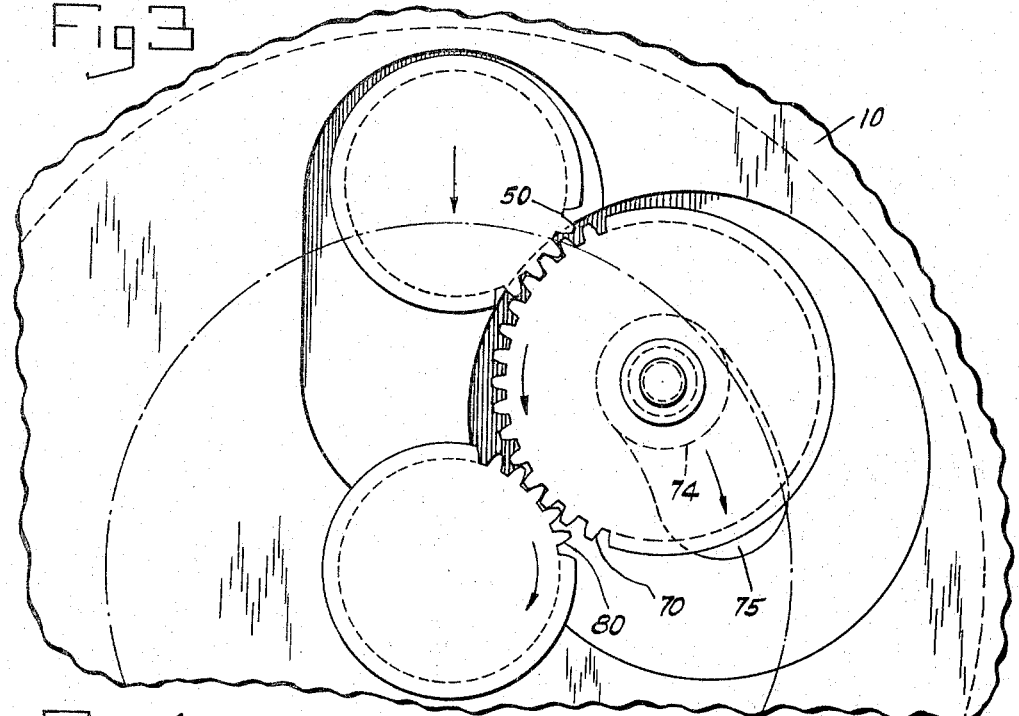
FIG. 3 is a diagram showing the index gearing in position for a crankshaft of maximum throw.
Figure 4:
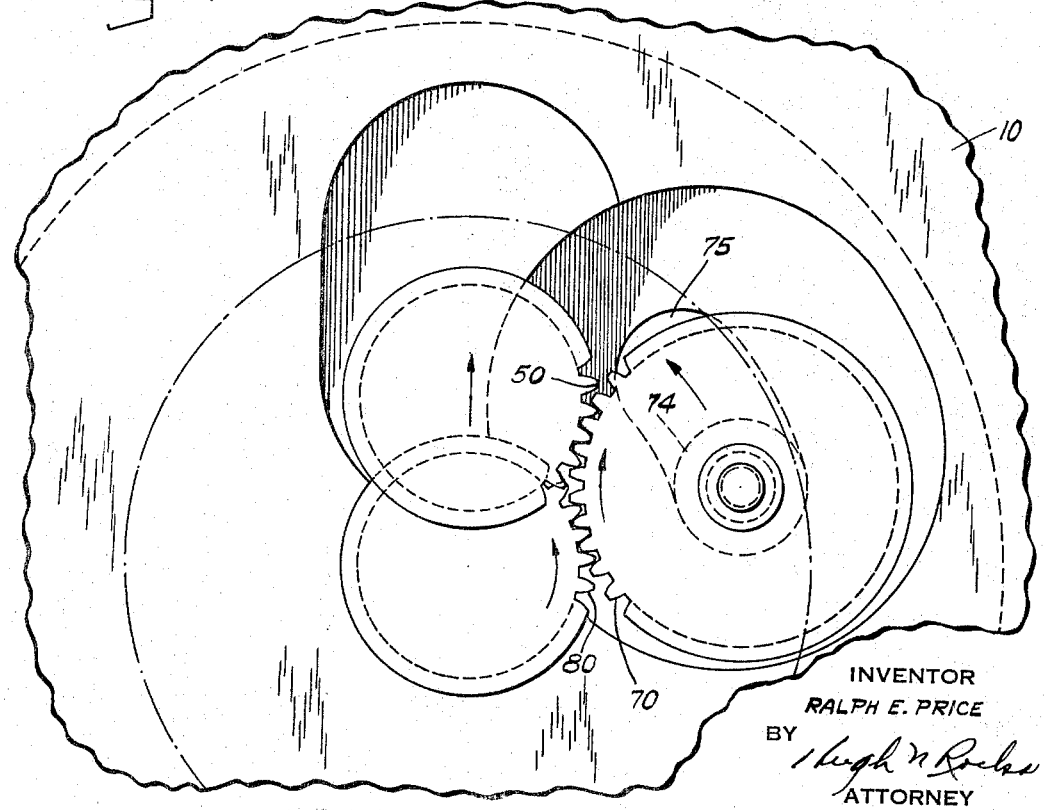
FIG. 4 is a diagram showing the index gearing in position for a crankshaft of minimum throw.

Idler gear 70 is rotatably mounted in an off center position on the left side (FIG. 2) of index housing 20 with its teeth engaging the teeth of pinion 50. The means for attaching idler gear 70 to index housing 20 is shown in the insert at the upper left hand section of FIG. 2. Gear 70 is mounted on bushing 71 having a smaller diameter portion 72 in a corresponding opening in housing 20. Bushing 71 is secured to housing 20 by means of screw 73. The head end 74 of bushing 71 extends into an arcuate cam slot 75 in spindle 10.

Pinion 80 is secured to the end of brake shaft 81 by means of screw 82 and supported with said shaft in a ball bearing 83. The teeth of pinion 80 also engage the teeth of idler gear 70.

Other details of the index mechanism are shown in U.S. Patent 2,651,895, granted Sept. 15, 1953, now Reissue Patent 24,091, granted Nov. 22, 1955, and U.S. Patent 3,118,258, granted Jan. 21, 1964.

Index housing 20 has a flange portion 90 having a bevelled peripheral surface 91. The inside face 92 of flange 90 bears against the face portion 93 on housing 12. Housing 20 may be adjusted vertically to change the distance between the axis 100 of shaft 22 and the axis 101 of spindle 10 to correspond to the throw of different cranks.

The means for effecting vertical adjustment of housing 20 consists of pin 105 having a lower end corresponding in shape to the bevelled peripheral surface 91 of flange 90. Pin 105 is slidably mounted in housing 12 and adjusted downwardly by means of screw 106 to effect a corresponding downward adjustment of housing 20. A similar pin 110 is slidably mounted in housing 12 at the underside of flange 90 and may be adjusted by screw 111 to shift housing 20 upwardly.

Operation

When it is desired to adjust index housing 20 for an increased throw, adjusting screw 106 is backed off to permit upward movement of housing 20. Screw 111 is turned to move pin 110 and housing 20 upwardly to the extent permitted by the adjustment of screw 106. During this movement, idler gear 70, which is attached to housing 20, moves upwardly with said housing, and the head end 74 of bushing 71 moves in slot 75 to shift gear 70 to the left to maintain engagement with pinions 50 and 80.

During this movement, pinion 50 is held against rotation by plunger 61 in notch 60 in index plate 21. Idler gear 70 moving inwardly will turn in a clockwise direction and pinion 80 will turn in a counter-clockwise direction.

If it is desired to shift housing 20 downwardly for a smaller throw, slot 75 will guide bushing head end 74 and idler gear 70 to the right to maintain engagement with pinions 50 and 80 as pinion 50 approaches pinion 80.

During this movement, pinion 50 is again held against rotation by plunger 61. Idler gear 70 moves outwardly and turns in a counter-clockwise direction and pinion 80 turns in a clockwise direction.

I claim:
1. In apparatus for holding and rotating a crankshaft,
   (a) a work drive spindle,
   (b) a work clamping fixture on said spindle,
   (c) a rotatably mounted index plate in said fixture,
   (d) a gear mounted for rotation with said index plate,
   (e) a gear rotatably mounted in said spindle,
   (f) an intermediate gear for separately engaging each of said first mentioned gears,
   (g) means to adjust said index plate radially to accommodate crankshafts of different throws,
   (h) and means to maintain engagement between said intermediate gear and said index plate gear as said index plate is adjusted radially.

2. In apparatus for holding and rotating a crankshaft,
   (a) a work drive spindle,
   (b) a work clamping fixture on said spindle,
   (c) a rotatably mounted index plate in said fixture,
   (d) a gear mounted for rotation with said index plate,
   (e) a gear rotatably mounted in said spindle,
   (f) an intermediate gear for separately engaging each of said first mentioned gears,
   (g) means to adjust said index plate radially to accommodate crankshafts of different throws,
   (h) and including means to shift said intermediate gear toward or from said index plate gear when said index plate is shifted radially.

3. In apparatus for holding and rotating a crankshaft,
   (a) a work drive spindle,
   (b) a work clamping fixture on said spindle,
   (c) a rotatably mounted index plate in said fixture,
   (d) a gear mounted for rotation with said index plate,
   (e) a gear rotatably mounted in said spindle,
   (f) an intermediate gear for separately engaging each of said first mentioned gears,
   (g) means to adjust said index plate radially to accommodate crankshafts of different throws,
   (h) and including means to shift said intermediate gear toward or from said index plate gear when said index plate is shifted radially comprising
   (i) a cam on said spindle and a follower on said intermediate gear.

4. In apparatus for grinding a crankshaft having
   (a) a plurality of axially and angularly spaced crankpins,
   (b) a work driving head having
   (c) a rotatable spindle,
   (d) a clamping fixture mounted on said spindle for holding a crankshaft eccentrically, whereby to rotate said crankshaft about the axis of one of said crankpins,
   (e) means for indexing said crankshaft angularly in said clamping fixture comprising
   (f) an index plate having
   (g) means for engaging and rotating a crankshaft in said clamping fixture,
   (h) a pinion on said index plate,
   (i) a pinion on said spindle,
   (j) an intermediate idler gear on said index plate offset from said pinions,
   (k) said pinions being in operative engagement with said idler gear, but not with each other,
   (l) means to shift said index plate radially to change the distance between centers of said pinions to provide for crankshafts of different throws,
   (m) and means responsive to shifting said index plate to shift said idler gear in a direction to maintain operative relation with said pinions.

5. In apparatus for grinding a crankshaft having
   (a) a plurality of axially and angularly spaced crankpins,
   (b) a work driving head having
   (c) a rotatable spindle,
   (d) a clamping fixture mounted on said spindle for holding a crankshaft eccentrically, whereby to rotate said crankshaft about the axis of one of said crankpins,
   (e) means for indexing said crankshaft angularly in said clamping fixture comprising
   (f) an index plate having
   (g) means for engaging and rotating a crankshaft in said clamping fixture,
   (h) a pinion on said index plate,
   (i) a pinion on said spindle,
   (j) an intermediate gear on said index plate offset from said pinions,
   (k) said pinions being in operative engagement with said intermediate gear, but not with each other,
   (l) means to shift said index plate radially to change the distance between centers of said pinions to provide for crankshafts of different throws,
   (m) and means responsive to shifting said index plate to shift said intermediae gear in a direction to maintain operative relation with said pinions comprising
   (n) a guide member in said spindle for shifting said intermediate gear to maintain operative relation with said pinions.

6. In apparatus for grinding a crankshaft having
   (a) a plurality of axially and angularly spaced crankpins,
   (b) a work driving head having
   (c) a rotatable spindle,
   (d) a clamping fixture mounted on said spindle for holding a crankshaft eccentrically, whereby to rotate said crankshaft about the axis of one of said crankpins,
   (e) means for indexing said crankshaft angularly in said clamping fixture comprising
   (f) an index plate having
   (g) means for engaging and rotating a crankshaft in said clamping fixture,
   (h) a pinion on said index plate,
   (i) a pinion on said spindle,
   (j) an intermediate idler gear on said index plate offset from said pinions,
   (k) said pinions being in operative engagement with said idler gear, but not with each other,
   (l) means to shift said index plate radially to change the distance between centers of said pinions to provide for crankshafts of different throws,
   (m) and means responsive to shifting said index plate to shift said idler gear in a direction to maintain operative relation with said pinions comprising
   (n) a guide member in said spindle,
   (o) and means on said idler gear engaging said guide member for shifting said idler gear.

7. Apparatus for grinding a crankshaft including
(a) a work spindle having mounted thereon a work clamping fixture which includes
(b) an index plate rotatably mounted in said work clamping fixture,
(c) a shaft mounted in said work spindle for rotation about an axis parallel to the axis of said index plate,
(d) an operative drive connection between said shaft and said index plate for rotatably indexing said index plate and said work clamping fixture,
(e) means to adjust said index plate radially to accommodate crankshafts of different throws,
(f) and means to maintain said operative drive connection between said shaft and said index plate as said index plate and work clamping fixture are adjusted radially.

References Cited
UNITED STATES PATENTS

| | | | |
|---|---|---|---|
| 2,113,388 | 4/1938 | Silven | 51—237 |
| 2,454,186 | 11/1948 | La Fleur | 51—237 |
| 2,651,895 | 9/1953 | Rocks | 51—237 X |

HAROLD D. WHITEHEAD, *Primary Examiner.*